Oct. 12, 1971   G. T. GUINTOS   3,611,704
UNIVERSAL CLOCK WITH CALENDAR AND ANUNCIATOR MEANS
Filed Dec. 5, 1969   6 Sheets-Sheet 1

INVENTOR.
GORGONIO T. GUINTOS
BY
Victor J. Evans & Co.
ATTORNEYS

Oct. 12, 1971   G. T. GUINTOS   3,611,704
UNIVERSAL CLOCK WITH CALENDAR AND ANUNCIATOR MEANS
Filed Dec. 5, 1969   6 Sheets-Sheet 4
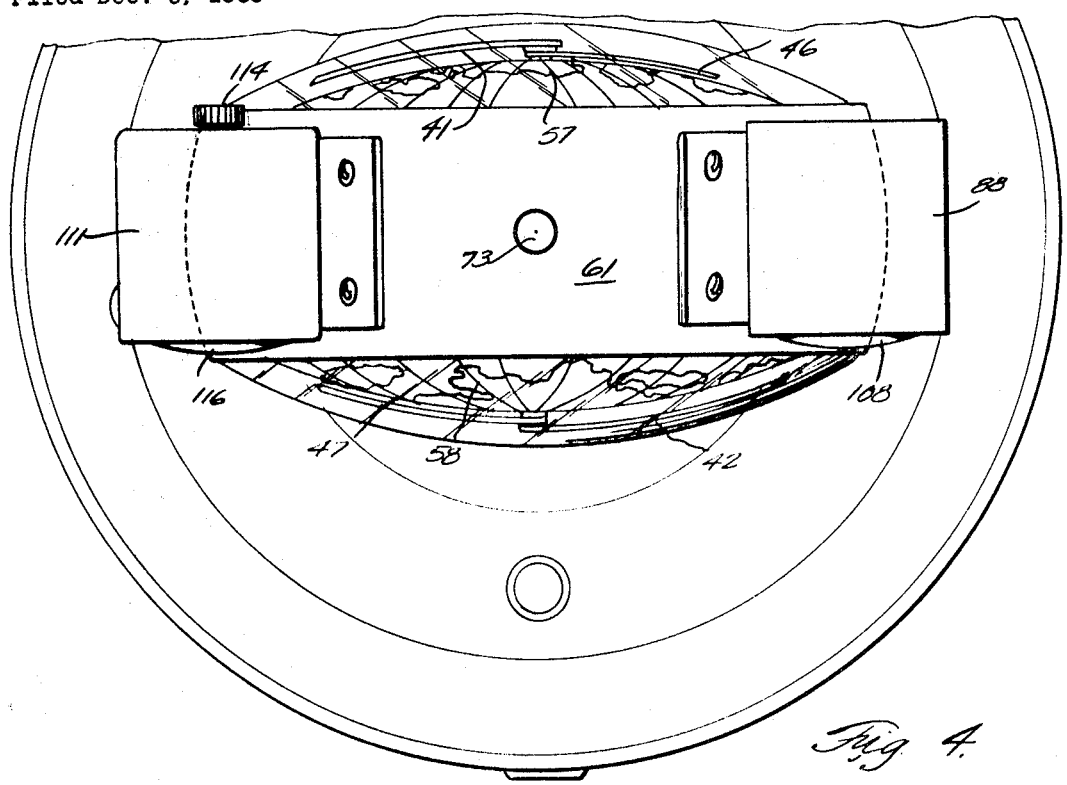
Fig. 4.
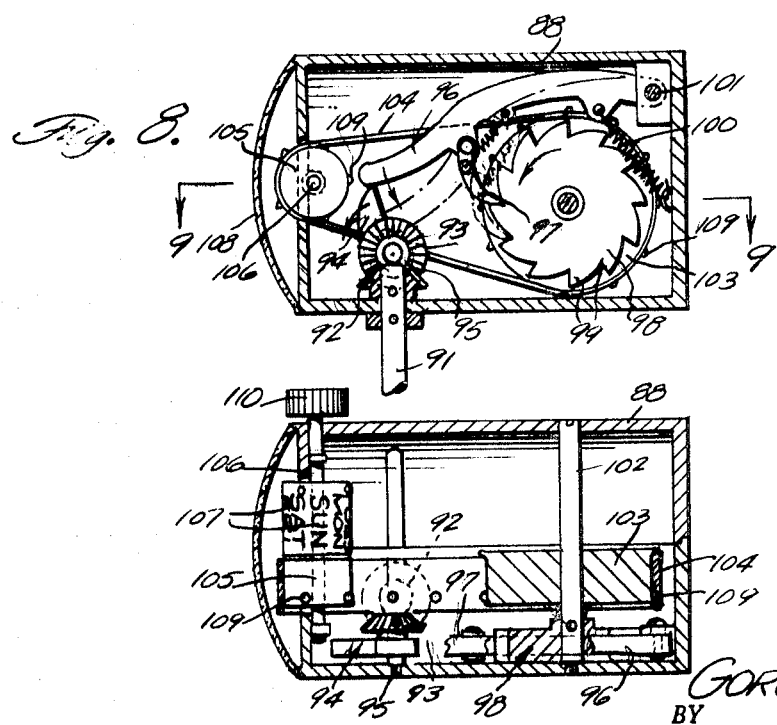
Fig. 8.
Fig. 9.
INVENTOR.
GORGONIO T. GUINTOS
BY
Victor J. Evans & Co.
ATTORNEYS

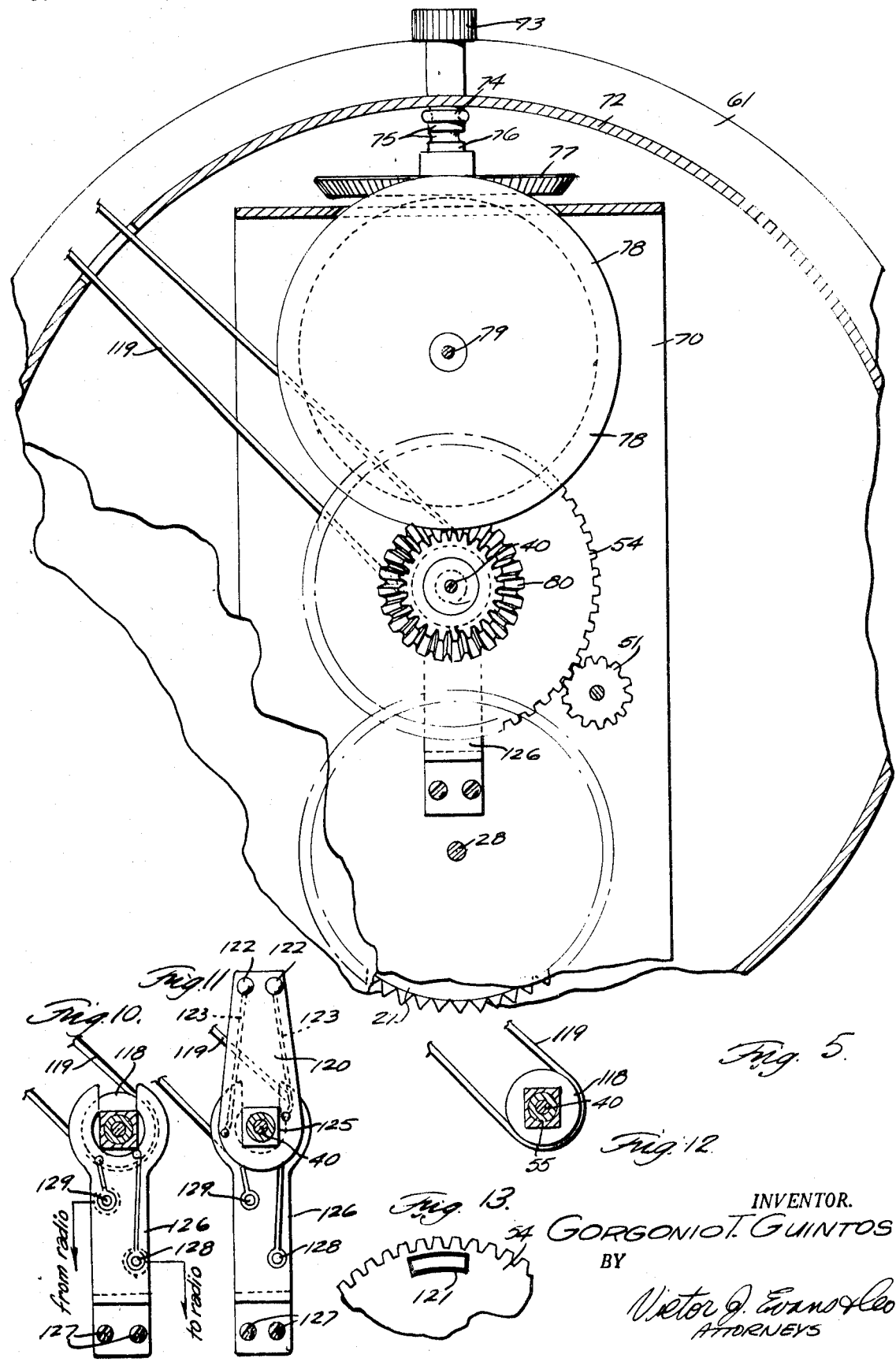

Oct. 12, 1971 G. T. GUINTOS 3,611,704
UNIVERSAL CLOCK WITH CALENDAR AND ANUNCIATOR MEANS
Filed Dec. 5, 1969 6 Sheets-Sheet 6

INVENTOR.
GORGONIO T. GUINTOS
BY
Victor J. Evans & Co.
ATTORNEYS

United States Patent Office 3,611,704
Patented Oct. 12, 1971

3,611,704
UNIVERSAL CLOCK WITH CALENDAR AND
ANNUNCIATOR MEANS
Gorgonio T. Guintos, Hinobaan, Negros
Occidental, Philippines
Filed Dec. 5, 1969, Ser. No. 882,531
Int. Cl. G04b 19/24
U.S. Cl. 58—44
6 Claims

ABSTRACT OF THE DISCLOSURE

A clock consists of a pair of rotary dials and cooperating clock hands. One dial represents the northern hemisphere of the earth and the other dial the southern hemisphere. A drive motor and gearing power the dials and clock hands in such a manner that accurate time is indicated at various degrees of longitude in both hemispheres. A calendar indicator is coordinated with the clock gearing. The base of the clock contains an annunciator which may sound the time at various points on the earth.

The prime objective of the invention resides in the provision of a clock which will indicate meridian times at all points on the earth at an easy glance. The clock has a second and inherent value to the user who, by observing it, constantly gains much information about the geography of the entire earth and will acquaint himself with various places and their times in comparison to his own location. Thirdly, the clock serves somewhat as a counter or computer that supplies automatically the precise time at any location on the earth around the equator. The basic timepiece of the invention can be produced in a somewhat simplified form as a wristwatch or pocket watch rather than in the form of a full table or pedestal clock with calendar and annunciator system. The invention has great utility as a teaching aid for primary and intermediate grade students. The students are assisted in learning geography and how the solar system operates and in particular how the earth revolves around the sun and turns on its own axis.

The annunciator portion of the invention may be utilized for waking up a person with a voice in any desired language and in a polite manner, rather than by the ringing of a bell. Many variations are possible.

The clock possesses two opposing twenty-four hour dials and two revolving hemisphere dials or discs depicting the northern and southern hemispheres of the earth. The entire map of the world is shown on the hemisphere dials including sufficient detail to be useful. The user of the clock will look normally at the hemisphere in which he lives. If the globe embodied in the two hemisphere dials were arranged with the axis upright, the northern hemisphere on top and the southern hemisphere on the bottom, and imagining the sun at the side of the equator, it may be noticed that the globe rotates counterclockwise exactly as the earth does. For this reason, the northern hemisphere time dial is arranged counterclockwise. It also possesses night and day indication. The hours from 6 to 6 on the upper half of the time dial indicate daylight while the hours from 6 to 6 on the lower portion of the dial indicate night. It is preferable to print the day and night portions of the time dials in contrasting colors to enhance realism. The circumference of the globe at the equator is divided equally by thirty-six meridian lines drawn from north to south poles with ten degree spacing. Each ten degrees of longitude is equivalent to forty minutes of time. For further convenience, if desired, five degree longitude subdivisions may be employed, equivalent to twenty minute readings.

Other features and advantages of the invention will be understood during the course of the detailed description.

BRIEF DESCRIPTION OF THE DRAWING FIGURES

FIG. 4 is a fragmentary plan view of the clock.

FIG. 5 is a fragmentary vertical section taken on line 5—5 of FIG. 3.

FIG. 8 is a fragmentary section taken on line 8—8 of FIG. 1.

FIG. 9 is a horizontal section taken on line 9—9 of FIG. 8.

FIG. 10 is an enlarged fragmentary vertical section taken on line 10—10 of FIG. 3.

FIG. 11 is a similar view taken on line 11—11 of FIG. 3.

FIG. 12 is a similar view taken on line 12—12 of FIG. 3.

FIG. 13 is a similar section taken on line 13—13 of FIG. 3.

DETAILED DESCRIPTION OF PREFERRED EMBODIMENT

Figure 3:
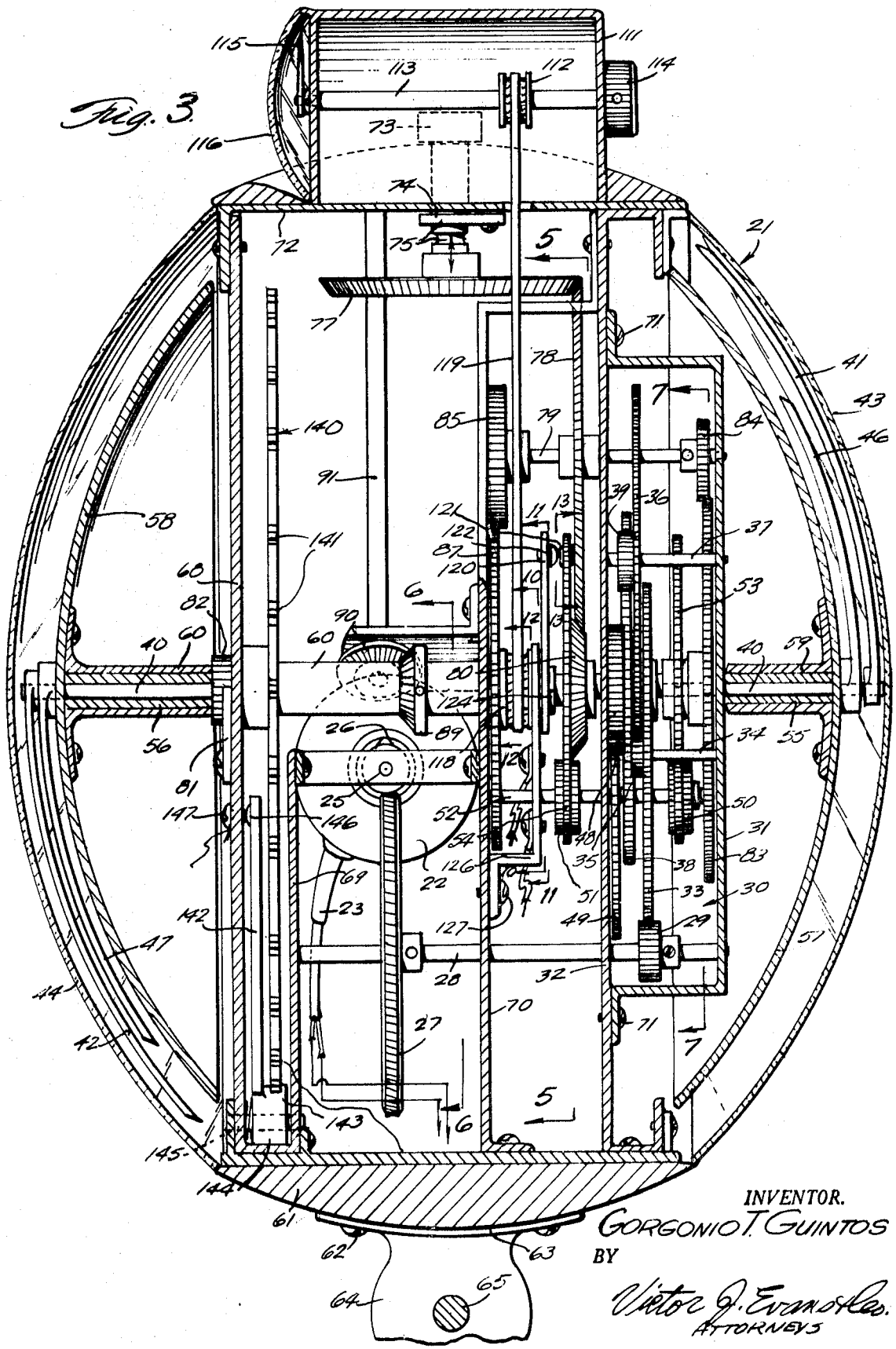
FIG. 3 is an enlarged central vertical section taken on line 3—3 of FIG. 1.
Figure 6:
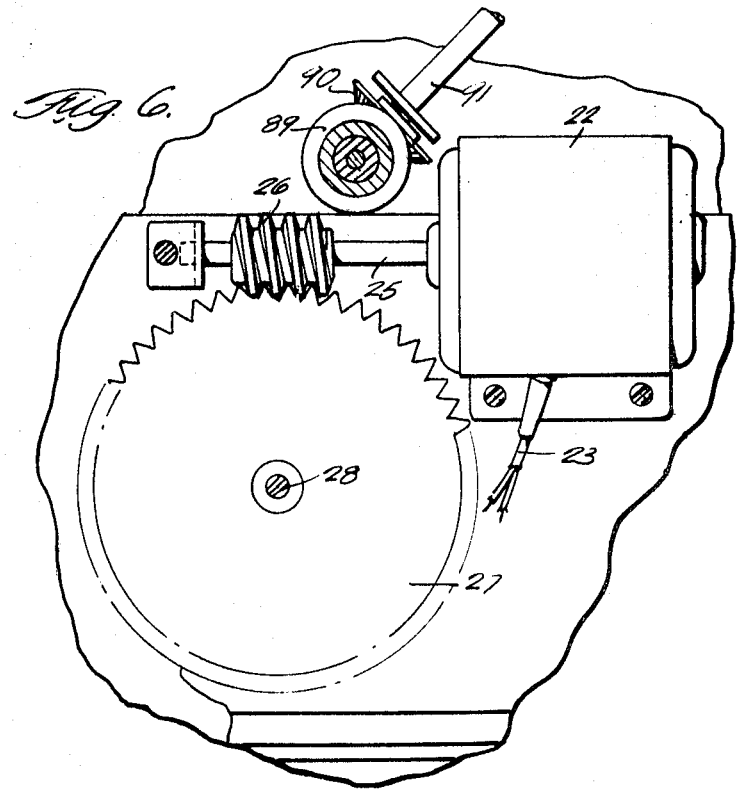
FIG. 6 is a similar section taken on line 6—6 of FIG. 3.
Figure 7:
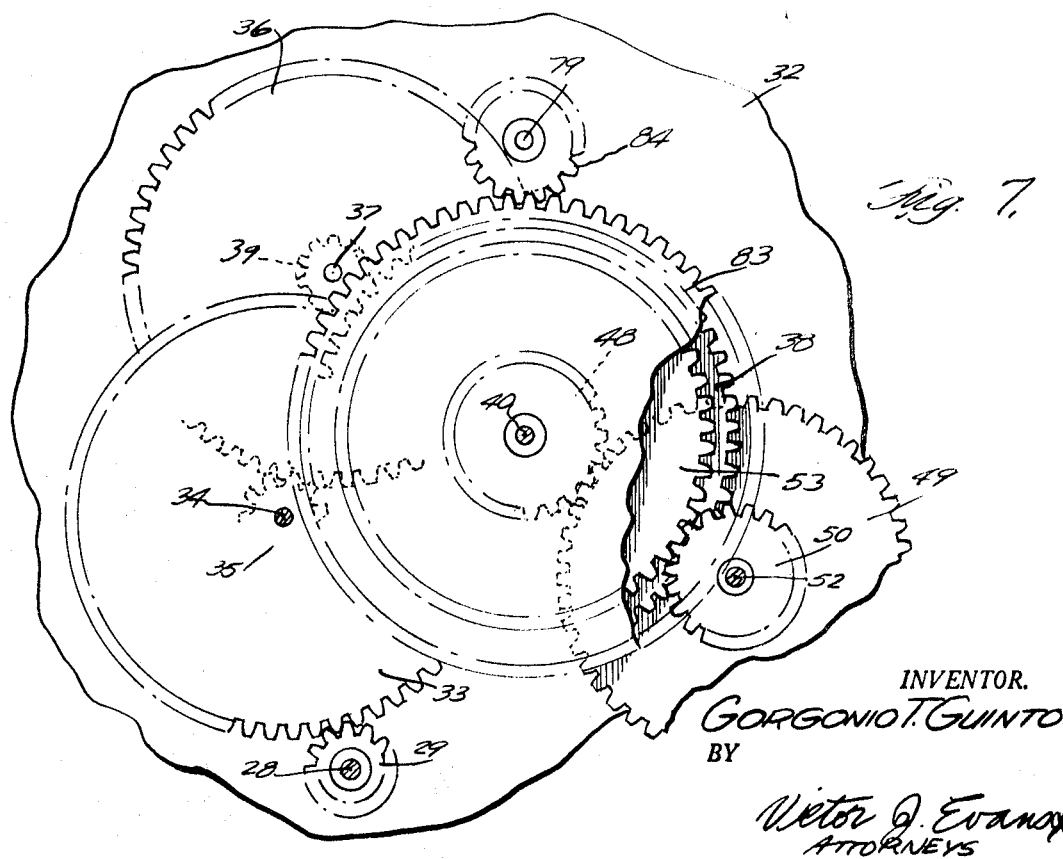
FIG. 7 is a similar section taken on line 7—7 of FIG. 3.

Referring to the drawings in detail wherein like numerals designate like parts throughout the same, the clock has a cylindrical base 20 constituting a housing for an annunciator apparatus, to be fully described, and mounted upon the top of this base is the universal clock 21 forming the heart of the invention and shown in detail in the other drawing figures and in particular by FIG. 3.

As shown in FIG. 3, an induction motor 22 is powered through a cable 23 whose terminals are set in a socket 24 on the top of housing 20. Let it be assumed that the motor 22 has its armature shaft 25 driven at a speed of 750 r.p.m. or 90,000 revolutions in two hours. Under these circumstances, a worm gear 26 on the shaft 25 will drive a worm wheel 27, carried by a shaft 28,900 revolutions in two hours where the worm wheel has 200 teeth. A pinion 29 on the shaft 28 within a chamber 30 formed between the two parallel walls 31 and 32 meshes with and drives a larger gear 33 nine times slower. Since the pinion 29 revolves 900 times in two hours, the gear 33 will revolve 100 times in the same period of two hours. The gear 33 is mounted on a short parallel shaft 34 and this shaft also carries a small pinion 35 rigid with the gear 33 and turning therewith. The pinion 35 meshes with and drives another gear 36 on a shaft 37 ten times slower than the gear 33 thus the gear 36 is revolving ten times in two hours. Lastly, the gear 38 is also driven ten times slower by a pinion 39 on the shaft 37 which turns with the gear 36. The gear 38 will revolve at the required speed of one revolution within each period of two hours.

The gear 38 is fixed on the main axial shaft 40 of the clock which extends through the clock works, as shown in FIG. 3. As shown, the minute hands 41 and 42 for the southern and northern hemisphere time dials 43 and 44 are directly secured to the extremities of the shaft 40 and revolve therewith once in every two hours. This is the required speed of the two minute hands so that every space of one hour on the time dials 43 and 44 will correspond to every five minutes; that is to say, from 6 a.m. to 6 p.m. will equal 60 minutes.

Figure 1:
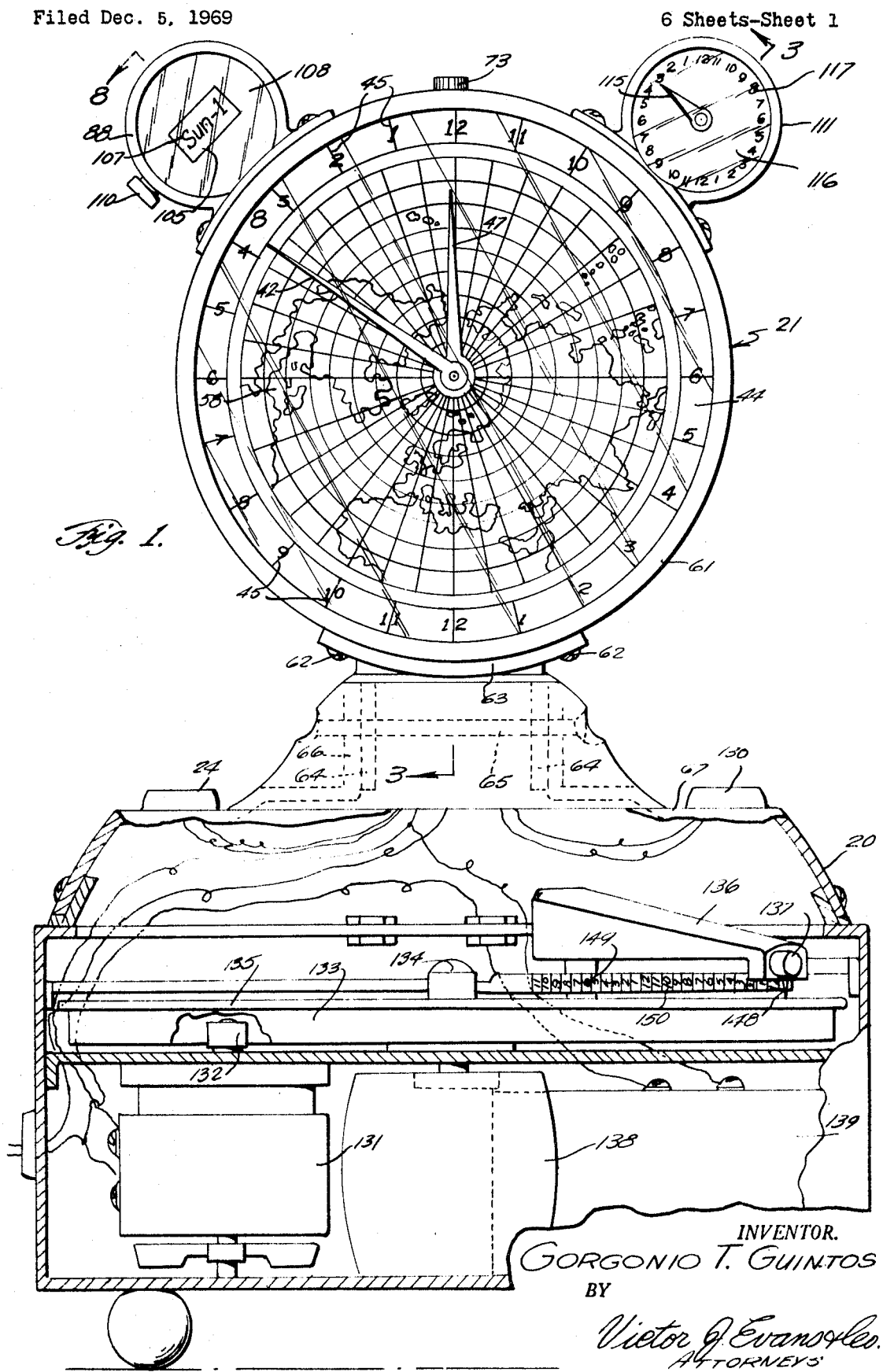
FIG. 1 is a front elevational view, partly in section, looking at the northern hemisphere clock dial and associated elements and showing annunciator components in the base of the clock.
Figure 2:
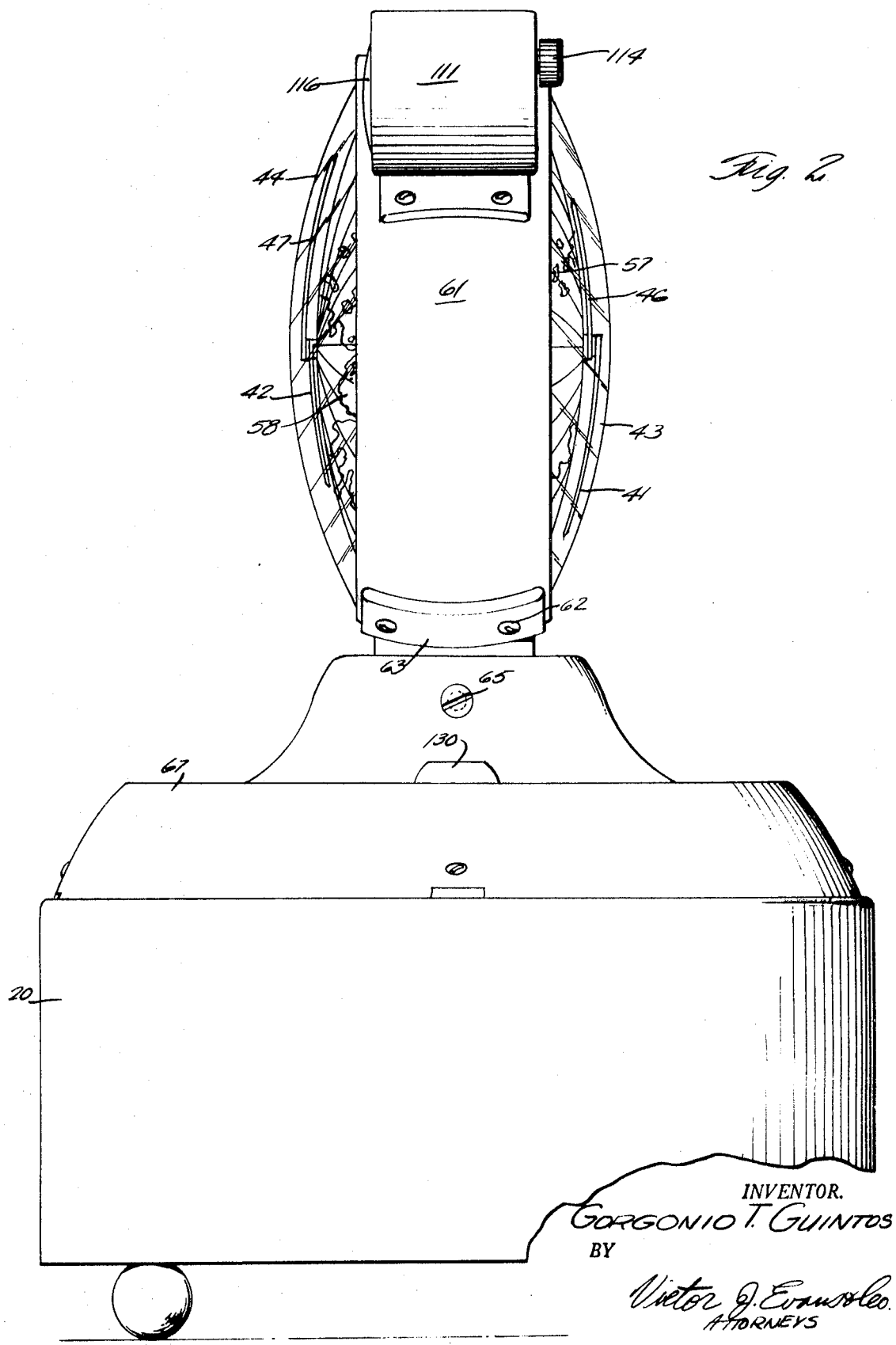
FIG. 2 is a side elevation of the clock.

In this regard, FIG. 1 of the drawings shows the northern hemisphere stationary time dial 44 graduated counterclockwise in 24 1-hour markings 45. The southern hemisphere time dial 43 is identically graduated but in the clockwise direction. The minute hands 41 and 42 lie immediately beneath the convex time dials as shown in FIG. 3.

In order to connect and correlate the movement of the minute hands with the hour hands 46 and 47, a pinion 48 secured firmly to the shaft 40 along with gear 38 drives another gear 49 six times slower. By this speed ratio, the gear 49 will attain a speed of one revolution in 12 hours. Pinions 50 and 51 secured to shaft 52 along with gear 49 drive gears 53 and 54, respectively, two times slower. Gears 53 and 54 thus rotate once in each 24 hours, as required. These two gears are connected directly with tubular shafts 55 and 56 surrounding the minute hand shaft 40, and the shafts 55 and 56 carry the hour hands 46 and 47, respectively, for the southern and northern hemispheres. By this means, the hour hands operate in unison at the proper speeds and in the proper directions.

The clock further embodies southern and northern hemisphere revolving dials or discs 57 and 58 which move with and at the same speed as the hour hands 46 and 47. The dials 57 and 58 are secured to sleeves 59 and 60 which are press fitted onto the shafts 55 and 56 of the hour hands so as to turn therewith. The dials 57 and 58 contain the geography of the southern and northern hemispheres of the earth including meridian lines in sufficient detail to show localities of major interest around the world, thus enabling an observer of the clock hands for either hemisphere to known precisely the time in his particular locality and also at all other points on the globe by reference to the stationary time dials 43 and 44 for the southern and northern hemispheres.

The basic clock mechanism, above-described, is physically supported on a sturdy ring 61 which forms the body portion of the clock and the lower side of this ring is secured at 62 to a curved mounting bracket or seat 63 having lugs 64 which receive a pivoting and securing bolt 65 therethrough, also engaging through apertured flanges 66 of the crowned portion 67 of base or housing 20. By this connecting means, the ring 61 and the entire clock works may be adjusted or tilted to any convenient angle for viewing and releasably secured in the selected adjusted position.

The various gears and their shafts, previously described, are conventionally supported on plates or walls 68, 69 and 70 and the previously-mentioned walls 31 and 32, the latter suitably joined as by screws 71. The several parallel plates or walls supporting the clock gearing are suitably secured to a liner ring 72 fixed in the bore of the ring 61. The details of mechanical construction for supporting the clock gearing may be varied under the invention and it is therefore thought that no further description of this is required for a proper understanding of the invention.

Means are provided to set the hands of the universal clock in accordance with any location on the map where the user happens to live. This is accomplished by depressing the time setting knob 73 at the top of the clock 21 until a clicking sound indicates that a spring clip 74 has entered the upper one of a pair of grooves 75 in an axially shiftable shaft 76 having a bevel gear 77 secured thereon. This depression of the knob 73 shifts the time setting bevel gear 77 into mesh with a bevel gear 78 on a shaft 79 but loosely mounted on this shaft. The knob 73 is now turned to the left causing the bevel gear 77 to drive bevel gear 78 which in turn drives a bevel gear 80. The bevel gear 80 is firmly secured to the tubular shaft 56 for the northern hemisphere hour hand 47. Turning of the knob 73 to the left causes the bevel gear 80 to revolve clockwise and this in turn causes northern hemisphere hour hand 47 to turn clockwise while leaving the northern hemisphere dial 58 stationary due to the action of a pawl 81 which engages a ratchet wheel 82 on the sleeve 60 and locks it against turning.

When the hour hand shaft 56 is turned counterclockwise, sleeve 60 will follow because the two elements are press fitted and the sleeve 60 is free from the action of the pawl 81 while turning counterclockwise. In other words, when setting the hour hand 47, the knob 73 must always be turned to the left so that the associated hemisphere dial 58 will remain stationary or continue on its regular motion with the clock works. When the correct time is to be set, the knob 73 is turned to the right, so that the hemisphere dial 58 will follow along with the turning of the hour hand 47 until the hour hand points to the desired time.

The setting of time on the southern hemisphere time dial 43 is performed in the same way because the two hour hands and two minute hands of the clock revolve together. Therefore, when the knob 73 is depressed and turned to the left, the gear 80 will turn clockwise, as stated, along with the gear 54. The gear 54 being in mesh with the pinion 51 causes the latter through the shaft 52 to revolve the pinion 50. The pinion 50 turns the gear 53 on tubular shaft 55 to which the southern hemisphere hour hand 46 is secured. Pinions 51 and 50 are equal in size and drive gears 54 and 53 which are also equal in size and therefore revolve at equal speeds, turning the two hour hands 46 and 47 in unison. However, unlike the shaft 56 which is tightly inserted in the sleeve 60, the shaft 55 is loose in the sleeve 59. In this condition, the gear 53 revolves independently of gear 83, FIG. 3. However, gear 83 which revolves with southern hemisphere dial 57 through shaft 59 is driven by a pinion 84, together with another pinion 85, both firmly secured to the shaft 79, while the bevel gear 78, previously mentioned, is loose on the shaft 79. Pinion 85 is in mesh with another gear 87 which is firmly secured to shaft or sleeve 60 where the northern hemisphere dial 58 is secured. Therefore, the gear 87 turns with the northern hemisphere dial 58. It follows, therefore, that the gear 83 will revolve with the southern hemisphere dial 57 through pinions 85 and 84 that cause their movement. In a word, the northern and southern hemisphere dials 58 and 57 revolve in unison. If the northern hemisphere hour hand 47 moves, the southern hemisphere hour hand 46 also moves in the same direction and at the same speed. So do the two minute hands 42 and 41 which are on the same shaft 40 extending entirely through the clock works, FIG. 3. The minute hand also turns with the setting of the hour hand through the engagement of the gear 49 with pinion 48. Gear 49 revolves with pinions 50 and 51 and hence they are connected with the time setting knob 73. The pinion 48, when driven by gear 49, turns the two minute hands 42 and 41 because it is rigid with the through shaft 40 to which the minute hands are attached. However, when pinion 48 is turned by the knob 73 only, the gear 38 does not follow although the two are on the same shaft because it is locked by worm 26 through pinion 39, gear 36, pinion 35, gear 33, pinion 29 and gear 27. The construction is made in this manner so that the continuous turning of the motor shaft 25 will not interfere with the setting of the time piece.

A calendar mechanism forming a feature of the invention is housed in a compartment 88 atop the ring 61 to one side of the knob 73, FIG. 1. A bevel gear 89 securely attached to shaft 60 drives another bevel gear 90 on a shaft 91 with a speed of one revolution every 24 hours. A further bevel gear 92, FIG. 8, is secured to the upper end of shaft 91. Bevel gear 92 meshes with an equal size bevel gear 93 in the chamber 88 and drives this gear at the same speed. Since bevel gear 89 turns once every 24 hours, bevel gear 93 will also attain the same speed of rotation. A cam 94 is secured to the shaft 95 of bevel gear 93 and once every 24 hours this cam lifts and quickly releases a follower arm 96. When the arm 96 is released by the cam, a spring-urged pawl 97 thereon advances a ratchet gear 98 in the direction of the arrow, FIG. 8, a distance equal to the spacing between adjacent teeth 99. The arm 96 is biased into active engagement with the ratchet gear by a retractile spring 100, and the arm is pivoted to the housing 88 at 101. Ratchet gear 98 is mounted on a shaft 102 with a pulley 103 in housing 88. Pulley 103 drives a belt 104 having calendar dates visibly marked thereon. The belt also engages a smaller pulley 105 on a shaft 106 near the other end of the housing 88. An extension of the pulley 105 bears visibly the days of the week indicated at 107 in FIG. 9. A transparent lens 108 secured to one end of the housing 88 allows easy viewing of the calendar. The calendar dates on the belt 104 and the week days symbols 107 on the pulley 105 are equidistantly spaced. The belt is geared to its two pulleys without slippage by small teeth or projections 109 on the pulleys. The distances between these teeth equal the distances between the date designations on the belt.

The section of the pulley 105 having the week day symbols 107 is preferably made integral with the shaft 106 whereas the pulley portion engaging the belt 104 is snug on the shaft 106 but can be adjusted thereon circumferentially. In order to set the date of the calendar, the user simply turns a knob 110 provided for this purpose until the desired date appears through the lens 108. Turning the knob to the right establishes the day of the week and turning it to the left will establish the month date on the belt 104 visible through the lens 108.

A housing 111 similar to the housing 88 is mounted on the opposite side of center on the ring 61, FIG. 4, and contains means for radio setting. This means simply comprises a chain gear 112, FIG. 3, on an axial shaft 113 journaled within the housing 111 and having a knob 114 on one end thereof for manual operation and a pointer 115 on its opposite end beneath a transparent lens 116 graduated counterclockwise in the 24 hours of the day as indicated at 117 in FIG. 1. The chain gear 112 is connected with another chain gear 118, FIG. 3, by a chain 119, the two gears 12 and 118 being of equal diameter. When a radio is to be set for turning on by means of the clock, knob 114 is turned to the right until the desired time for a certain radio station to be heard is indicated by the pointer 115 and associated time dial. This time indication corresponds exactly to the angular position of a switch arm 120 with respect to time on the northern hemisphere dial 44. As the gear 54 revolves, a coacting switch contact 121 carried by it, FIG. 13, will brush or contact elements 122 on arm 120 which is stationary. The elongated contact 121 bridges the two contact elements 122 and while in contact therewith establishes a circuit.

The time period for the desired radio setting, for example 30 minutes, is a direct function of the length of strip contact 121 measured from the end of the first engaged element 122 on arm 120. Each element 122 is electrically connected with a wire 123 on one side of arm 120. There is a bushing 124 projecting from the chain gear 118 to which the arm 120 is attached fixedly by a square opening 125 in the arm. A metal arm 126 secured at 127 to the adjacent wall 70 overlaps the arm 120. As the chain gear 118 revolves, the arm 120 also revolves but the arm 126 does not because it is loose on the bushing extending from the chain gear 118 and thus is stationary. Radio connection terminals are indicated at 128 and 129 in FIGS. 10 and 11.

A conventional slip ring electrical connection is provided between the arms 120 and 126 as indicated in FIGS. 10 and 11. A radio plug-in receptacle is provided on the base of the clock as shown at 130, FIG. 1, and the electrical connections between this receptacle and the terminals 128 and 129 are conventional and need not be dealt with in detail.

Referring now to FIG. 1 for describing the previously-mentioned annunciator means contained in the base or housing 20, such means generally consists of an induction motor 131 having a friction drive wheel 132 engaging and driving the rim of a record turntable 133 having a centering pin 134 for a suitable record disc 135 on the turntable. A conventional pick-up arm 136 with pick-up element 137 thereon coacts with a suitable speaker 138 in the housing 20. The electrical connections are conventional between the annunciator components and clock and need not be shown or described in full detail. A suitable amplifier 139 is also contained within the housing, FIG. 1.

Referring to FIG. 3, a large gear 140 has 24 teeth 141 spaced equally thereon representing 24 hours on the time dial 44, and when the gear 140 is assembled, it must harmonize with the position of the time dial. A switch arm 142 is disposed immediately outwardly of the gear 140 and opposite the wall 68. The passage of each gear tooth 141 into contact with a single tooth 143 on a hub portion 144 of the arm 142 once in each hour causes partial turning of the switch arm 142 on a lower pivot shaft 145, FIG. 3, such partial turning bringing a contact 146 on the arm 142 into engagement with a mating stationary contact 147 on the wall 68. The contacts 146 and 147 are very similar to the previously-described contacts 121 and 122, FIGS. 11 and 13, and operate in the same manner. As long as moving contact 146 bridges or engages contacts 147, current is supplied to the motor 131 to drive the turntable 133 with the record disc 135 thereon. The spacing between contacts 147 and the length of the bridging contact 146 is such that the needle 148, FIG. 1, will have sufficient time to trace the grooves of the record disc for a given announcement of the time of day designated by the clock. The record, for example, may announce the time of day and contain appropriate words to wake one from his sleep gently. Various desirable announcements or sounds may be recorded on the record disc 135 and the utility of the device is not limited to an alarm clock.

When plural messages are provided on the record disc 135, the disc should be divided into imaginary quadrants, such as 24 corresponding to 24 hourly intervals. The announcement of time and any other information desired must be recorded on the record within the space or quadrant separated from the remainder. In FIG. 1, a record time gauge 149 is provided slightly above the record 135 and traversing the same. One-half of the gauge 149 contains numerals 150 indicating the hours of the day and this extends under the pick-up arm 136 so that it is easy for the operator to set the time on the clock in synchronism with the record portion or announcement. In other words, the gauge 149 establishes placement of the needle 148 at the proper recorded band on the record disc. The gauge indicates the time of day to be announced and coordinates the announcement with the clock hands.

Without further description, it should now be clear that the invention encompasses a worldwide or universal clock having coordinated northern and southern hemisphere time dials and moving hemisphere geographical dials coordinated with two sets of clock hands. Additionally, there is a directly operated calendar to indicate the week day and month date driven by the clock works. Furthermore, there is a manually adjustable means to turn on a particular radio set at any selected hour of the day and there is a built-in annunciator means in the form of a record phonograph in the base of the clock enabling the automatic announcement of the time of day or to produce desired messages of any type. There is also a unique means to coordinate plural recorded messages of the record with the clock time dials and there is a simplified manual means for setting the clock hands adjacent the northern and southern hemisphere clock portions. The apparatus is versatile and performs a number of useful, coordinated functions while being a compact and relatively simple unit. The many advantages of the invention should now be apparent to those skilled in the art.

It should also be mentioned that the invention is capable of being fabricated as a small timepiece for pocket usage or as a wristwatch by omitting entirely the housing 20 and annunciator system, the calendar and its housing 88 and the radio setting means including housing 111. The remainder of the structure would be essentially the same as disclosed herein.

What is claimed is:

1. A universal clock comprising spaced opposed stationary time dials, a pair of clock hands disposed adjacent each time dial and adapted to traverse the dial, a geographical hemisphere disc connected with the hour hand of each pair of clock hands and turning therewith, a common shaft secured to and carrying the minute hands of each pair of clock hands whereby the minute hands will turn in unison over said time dials, gearing connected with said common shaft and with said hour hands to drive the same, motor means driving said gearing, a calendar mechanism mounted upon said clock to indicate the month date and week day and having a rotary driving part, and additional gearing interconnecting the first named gearing with said rotary driving part.

2. The structure of claim 1, and said calendar mechanism including an endless flexible belt having date indicia thereon, a rotary cam driven by said rotary driving part, and an intermittently operated means for said belt to move the same one step for each 24-hour period.

3. The structure of claim 2, and said intermittently operated means comprising a pawl and ratchet device connected with said belt and having a lever extension in the path of movement of said cam.

4. A universal clock comprising spaced opposed stationary time dials, a pair of clock hands disposed adjacent each time dial and adapted to traverse the dial, a geographical hemisphere disc connected with the hour hand of each pair of clock hands and turning therewith, a common shaft secured to and carrying the minute hands of each pair of clock hands whereby the minute hands will turn in unison over said time dials, gearing connected with said common shaft and with said hour hands to drive the same, motor means driving said gearing, tubular shafts surrounding end portions of said common shaft, said hemisphere discs connected with the tubular shafts and turning therewith, sleeves carrying the hemisphere discs and engaging snugly over the tubular shafts and turning therewith, and means continuously engaging said sleeve to selectively prevent movement of said disc as said hour hand rotates.

5. A universal clock comprising spaced opposed stationary time dials, a pair of clock hands disposed adjacent each time dial and adapted to traverse the dial, a geographical hemisphere disc connected with the hour hand of each pair of clock hands and turning therewith, a common shaft secured to and carrying the minute hands of each pair of clock hands whereby the minute hands will turn in unison over said time dials, gearing connected with said common shaft and with said hour hands to drive the same, motor means driving said gearing, said gearing having a switch contact thereon, and conductive means rotatably connected to said common shaft and selectively fixed at an angle within a plane transverse with said common shaft for timing the happening of a predetermined event, said conductive means having a portion thereof extending outward from said plane at a radial distance from said common shaft equal to that of said switch contact for close circuiting therewith.

6. A universal clock comprising spaced opposed stationary time dials, a pair of clock hands disposed adjacent each time dial and adapted to traverse the dial, a geographical hemisphere disc connected with the hour hand of each pair of clock hands and turning therewith, a common shaft secured to and carrying the minute hands of each pair of clock hands whereby the minute hands will turn in unison over said time dials, gearing connected with said common shaft and with said hour hands to drive the same, motor means driving said gearing, a base supporting said clock thereabove, phonograph annunciator means housed within said base, a gear rotatably connected to said common shaft, switch means controlled by said gear and connectable with said annunciator means for selectively actuating said annunciator means at least once a day, said annunciator means including track determining means correlated with said switch means for selectively actuating annunciation of different sound tracks on a record disc corresponding to different times of day.

References Cited

UNITED STATES PATENTS

| 1,344,913 | 6/1920 | Long | 58—42.5 |
| 2,977,433 | 3/1961 | Beiser et al. | 58—19 |
| 3,184,911 | 5/1965 | Canale et al. | 58—50 X |
| 3,420,051 | 1/1969 | Matteson | 58—14 |

RICHARD B. WILKINSON, Primary Examiner

E. C. SIMMONS, Assistant Examiner

U.S Cl. X.R.

58—4